(12) United States Patent
Chen

(10) Patent No.: US 7,999,678 B2
(45) Date of Patent: Aug. 16, 2011

(54) DEMODULATING MODULE, RFID SYSTEM UTILIZING THE DEMODULATING MODULE AND METHOD THEREOF

(75) Inventor: Chien-Sheng Chen, Hsinchu County (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 323 days.

(21) Appl. No.: 12/268,426

(22) Filed: Nov. 10, 2008

(65) Prior Publication Data
US 2009/0153330 A1 Jun. 18, 2009

(30) Foreign Application Priority Data

Dec. 14, 2007 (TW) ................................ 96147806 A

(51) Int. Cl.
*G08B 13/14* (2006.01)
(52) U.S. Cl. ................ 340/572.1; 340/539.1; 340/568.1
(58) Field of Classification Search .... 340/572.1–572.9, 340/539.1, 568.1, 539.13, 546
See application file for complete search history.

(56) References Cited

U.S. PATENT DOCUMENTS

| | | | | |
|---|---|---|---|---|
| 6,047,192 A * | 4/2000 | Maloney et al. | ............ | 455/456.2 |
| 6,412,086 B1 * | 6/2002 | Friedman et al. | ............. | 714/733 |
| 7,206,452 B2 * | 4/2007 | Kondo et al. | ................. | 382/233 |
| 7,304,579 B2 * | 12/2007 | Diorio et al. | ............... | 340/572.4 |
| 7,482,926 B2 * | 1/2009 | Pillai | .......................... | 340/572.1 |
| 7,493,288 B2 * | 2/2009 | Biship et al. | .................... | 705/50 |
| 7,659,823 B1 * | 2/2010 | Killian et al. | .............. | 340/572.4 |

FOREIGN PATENT DOCUMENTS
TW I272776 2/2007
* cited by examiner

*Primary Examiner* — Daniel Previl
(74) *Attorney, Agent, or Firm* — Winston Hsu; Scott Margo

(57) ABSTRACT

A demodulating module includes: a processing unit, for generating a control signal; and a demodulator, coupled to the processing unit and stored with a plurality of correlative coefficient masks, for receiving a data signal, selecting one of the correlative coefficient masks according to the control signal, generating a demodulated signal according to the data signal and the selected correlative coefficient mask, and transmitting the demodulated signal to the processing unit.

20 Claims, 3 Drawing Sheets

DEMODULATING MODULE, RFID SYSTEM UTILIZING THE DEMODULATING MODULE AND METHOD THEREOF

BACKGROUND OF THE INVENTION

1. Field of the Invention

The present relates to a demodulating module, an RFID (radio frequency identification) system utilizing the demodulating module, and a method thereof. More particularly, the present invention relates to a demodulating module utilizing a correlative coefficient mask for transforming data signals into corresponding data, an RFID system utilizing the demodulating module, and a method thereof.

2. Description of the Prior Art

In an RFID processing system, an RF signal received by an antenna needs to be decoded (or demodulated) after being processed by an RF front-end module. The decoding operation can be performed by means of software or hardware. One of the advantages of using software is that greater flexibility is available for coordinating with various kinds of communication protocols. However, when using software, there is a disadvantage that processing speed is slow and a powerful processor is required. Furthermore, if the RF signal has a poor duty cycle and the processing time is longer, a higher package error rate (PER) may occur as a result.

In contrast, when performing the decoding operation by hardware means, although the processing speed can be increased, the hardware structure is fixed to provide little flexibility that the hardware is unable to coordinate with various communication protocols.

SUMMARY OF THE INVENTION

Therefore, the present invention provides a demodulating module, which utilizes a plurality of correlative coefficient masks corresponding to different communication protocols to transform a data signal into corresponding data. Software and hardware can thereby be jointly used to demodulate a data signal.

According to one embodiment of the present invention, a demodulating module is disclosed. The demodulating module comprises: a processing unit, for generating a control signal; and a demodulator, coupled to the processing unit and stored with a plurality of correlative coefficient masks, for receiving a data signal, selecting at least one of the correlative coefficient masks according to the control signal, generating a demodulated signal according to the data signal and the selected correlative coefficient mask, and transmitting the demodulated signal to the processing unit.

According to another embodiment of the present invention, an RFID system is disclosed. The RFID system comprises: an antenna, for receiving an RF signal; an RFID front-end module, for transforming the RF signal into a data signal; a processing unit, for generating a control signal; and a demodulator, coupled to the processing unit and stored with a plurality of correlative coefficient masks, for receiving a data signal, selecting at least one of the correlative coefficient masks according to the control signal, generating a demodulated signal according to the data signal and the selected correlative coefficient mask, and transmitting the demodulated signal to the processing unit.

According to another embodiment of the present invention, a demodulating method is disclosed. The method comprises step of: providing a plurality of correlative coefficient masks, receiving a data signal, selecting at least one of the correlative coefficient masks, and generating a demodulated signal according to the data signal and the selected correlative coefficient mask.

Via the above-mentioned embodiment, the system is facilitated to coordinate with a plurality of communication protocols, and economical operation units can be implemented to decrease overall circuit costs.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
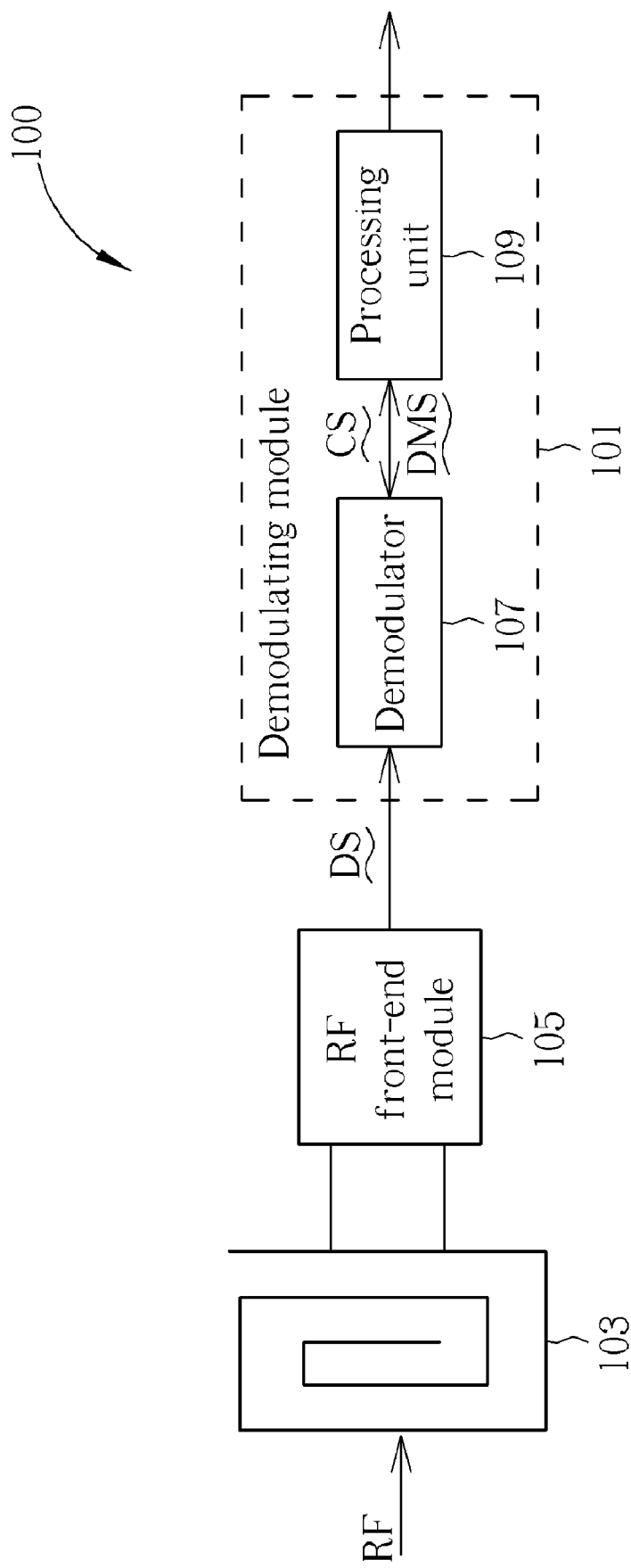
FIG. 1 illustrates a block diagram of an RFID system according to an embodiment of the present invention.

FIG. 1 illustrates a block diagram of an RFID system 100 according to an exemplary embodiment of the present invention. As shown in FIG. 1, the RFID system 100 comprises a demodulating module 101, an antenna 103 and an RF front-end module 105. The demodulating module 101 comprises a demodulator 107 and a processing unit 109. The antenna 103 receives an RF signal RF, and the RF front-end module 105 transforms the RF signal RF into a data signal DS, which may be in a digital format. The processing unit 109 generates a control signal CS. The demodulator 107, stored with a plurality of correlative coefficient masks, receives the data signal DS, and selects at least one of the correlative coefficient masks according to the control signal CS. Using the selected correlative coefficient mask for demodulating the data signal DS, the demodulator 107 generates a demodulated signal DMS, and transmits the demodulated signal DMS to the processing unit 109 for subsequent processes. In one embodiment, the plurality of correlative coefficient masks can respectively correspond to different encoding/decoding methods of different communication protocols, such as NRZ (Non-Return to Zero), Manchester, etc.

Figure 2:
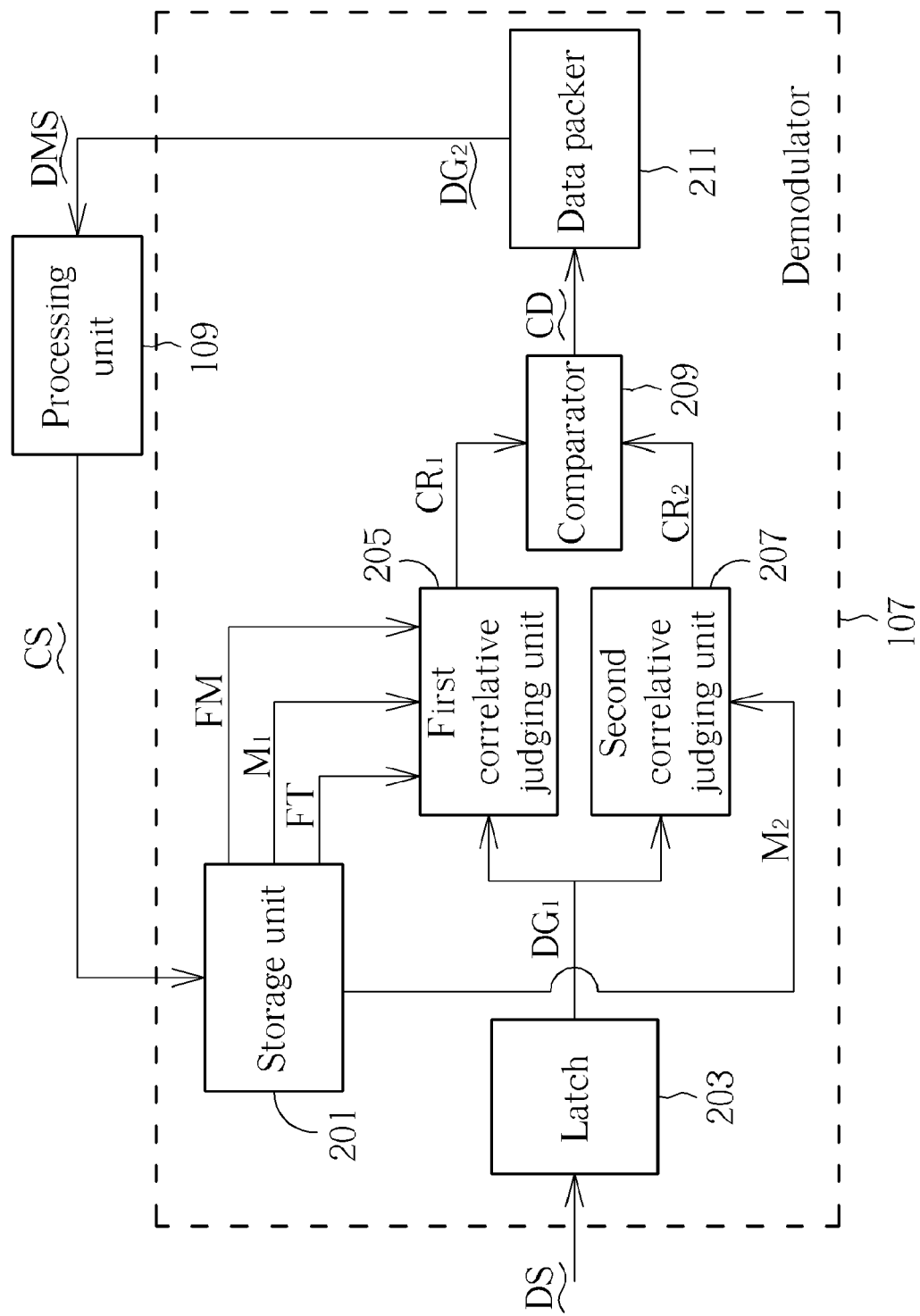
FIG. 2 illustrates a detailed configuration of a demodulator according to an embodiment of the present invention.

FIG. 2 illustrates a detailed configuration of a demodulator 107 according to an embodiment of the present invention. As shown in FIG. 2, the demodulator 107 comprises a storage unit 201, a latch 203, a first correlation judging unit 205, a second correlation judging unit 207, and a comparator 209. The storage unit 201 stores the correlative coefficient masks, and, according to the control signal CS, respectively provides a first correlative coefficient mask $M_1$ and a second correlative coefficient mask $M_2$ to the first correlation judging unit 205 and the second correlation judging unit 207. The latch 203 latches all or a part of the data signal DS to form a first data group $DG_1$. The first correlation judging unit 205 judges correlation between the first data group $DG_1$ and the first correlative coefficient mask $M_1$ according to the first correlative coefficient mask $M_1$ to output a first judging value $CR_1$. The second correlation judging unit 207 judges correlation between the first data group $DG_1$ and the second correlative coefficient mask $M_2$ according to the second correlative coefficient mask $M_2$ to output a second judging value $CR_2$. The comparator 209 compares the first judging value $CR_1$ and the second judging value $CR_2$ to generate corresponding data CD, which can be used as the demodulated signal DMS.

The first correlation judging unit 205 or the second correlation judging unit 207 can be a correlator, which can be implemented by a multiplexer or an adder. As known by persons skilled in the art, a correlator compares input data by using comparison data in a specific data format (the correlative coefficient masks in this embodiment), and a larger result is produced if the input data matches the specific data format. Specifically, when the correlator is a multiplier, the correlative coefficient mask in a specific data format is multiplied with the input data. As known by persons skilled in the art, a maximum value representing highest correlation is produced when the input data and the correlative coefficient mask are exactly the same. When the correlator is an adder, the data of the correlative coefficient mask is an inverse of the specific data format; that is, if the specific data format is 1001, the correlative coefficient mask is 0110. In this case, as known by persons skilled in the art, a maximum sum value representing highest correlation is produced when the input data and the correlative coefficient mask are totally inverse. Therefore, when different encoding/decoding methods are used, a correlative coefficient mask corresponding to the encoding/decoding method can be used to judge correlation of the data and the correlative coefficient mask, and then the input data is transformed to another data format according to the correlation.

The demodulator 107 may further comprise a data packer 211 for collecting a plurality of sets of the corresponding data to form a second data group $DG_2$ with a predetermined size, such as 8/16/32 bits, to be used as the demodulated signal DMS. The demodulator 107 also provides the second data group $DG_2$ to the processing unit 109. Therefore, the second data group $DG_2$ is the demodulated signal DMS in the presence of the data packer 211; otherwise, the corresponding data CD is the demodulated signal DMS.

Additionally, a data group usually has a data region and an auxiliary judging region. The auxiliary judging region, such as a frame sync region or a header region, is for recording a data amount or a starting point of data. Therefore, the storage unit 201 can further store a plurality of auxiliary judging masks FM, and the first correlation judging unit 205 or the second correlation judging unit 207 can judge correlation between the auxiliary judging region and a predetermined auxiliary judging mask according to the predetermined auxiliary judging mask selected from the auxiliary judging masks FM to help generate the first judging value $CR_1$ or the second judging value $CR_2$. Specifically, when the correlator determines the auxiliary judging region according to the predetermined auxiliary judging mask, the position of the data region can be determined. In this way, what is being compared with the correlative coefficient mask is ensured to be the data region instead of a noise, and thus encoding/decoding errors can be avoided.

The storage unit 201 further stores a threshold parameter FT. The first correlation judging unit 205 or the second correlation judging unit 207 generates the first judging value $CR_1$ or the second judging value $CR_2$ further depending on the threshold parameter FT. Specifically, the threshold parameter FT provides a threshold value. If the first judging value $CR_1$ or the second judging value $CR_2$ does not reach the threshold value, it is regarded as a noise or useless data to be invalidated, and therefore will not be used as a basis for data transformation.

It should be noted that the demodulating module according to the embodiment of the present invention can be implemented in other systems besides an RFID system, and the data signal DS input into the demodulating module can be any other data signal.

Figure 3:
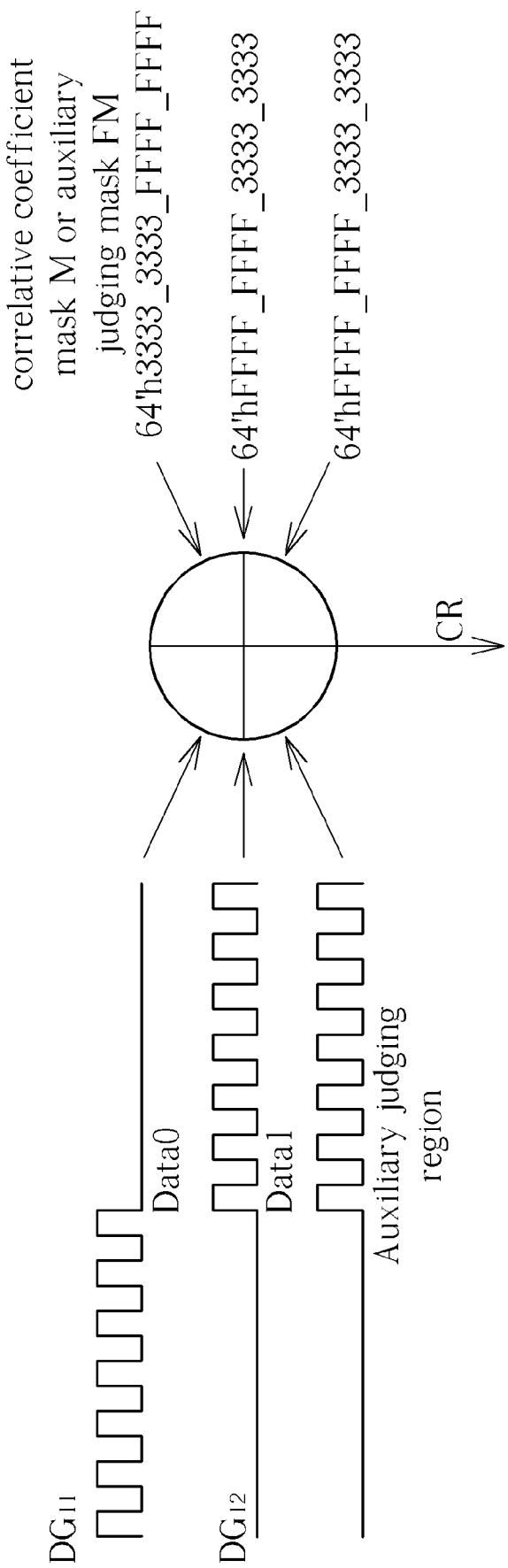
FIG. 3 illustrates a schematic diagram of operations of a demodulator according to an embodiment of the present invention.

FIG. 3 illustrates a schematic diagram of operations of a demodulator according to one embodiment of the present invention. As shown in FIG. 3, a correlation judging unit (an adder in this embodiment) is utilized to compare a data group and a mask. A data group $DG_{11}$ corresponds to Data0, and thus has larger correlation with a correlative coefficient mask corresponding to Data0 than a correlative coefficient mask corresponding to Data1. Also, once the comparator 209 gets a result that the data group $DG_{11}$ has larger correlation with a correlative coefficient mask corresponding to Data0, the data group $DG_{11}$ is transformed to Data0 (i.e. the abovementioned corresponding data). Similarly, a data group $DG_{12}$ corresponds to Data1, and thus has larger correlation with a correlative coefficient mask corresponding to Data1 than a correlative coefficient mask corresponding to Data0. Also, once the comparator 209 gets a result that the data group $DG_{12}$ has larger correlation with a correlative coefficient mask corresponding to Data1, the data group $DG_{12}$ is transformed to Data1. The auxiliary judging mask is compared with the auxiliary judging region to determine the position of the data region. In this embodiment, "64'" of the correlative coefficient mask or the auxiliary judging mask 64'h3333_3333_FFFF_FFFF indicates that the mask is 64-bits, and "h" indicates that the mask is represented in a 16-bit format. Thus, the mask that is used for comparison is the data 3333_3333_FFFF_FFFF. The mask examples 64'h3333_3333_FFFF_FFFF and 64'hFFFF_FFFF_3333_3333 shown in FIG. 3 follow the encoding/decoding standard of ISO14443A, but are not meant to be limitations on the scope of the present invention.

Via the abovementioned embodiment, the system is facilitated to coordinate with a plurality of communication protocols, and economical operation units can be implemented to decrease overall circuit costs.

Those skilled in the art will readily observe that numerous modifications and alterations of the device and method may be made while retaining the teachings of the invention.

What is claimed is:

1. An RFID system, comprising:
   an antenna, for receiving an RF signal;
   an RFID front end module, for transforming the RF signal into a data signal;
   a processing unit, for generating a control signal; and
   a demodulator, coupled to the processing unit and stored with a plurality of correlative coefficient masks, for receiving a data signal, selecting one of the correlative coefficient masks according to the control signal, generating a demodulated signal according to the data signal and the selected correlative coefficient mask, and transmitting the demodulated signal to the processing unit.

2. The RFID system of claim 1, wherein the correlative coefficient masks correspond to different communication protocols.

3. The RFID system of claim 1, wherein the demodulator comprises:
   a storage unit, coupled to the processing unit, for storing the correlative coefficient masks;
   a latch, for latching a part of the data signal to form a first data group;
   a first correlation judging unit, coupled to the latch and the storage unit, for judging, according to a first correlative coefficient mask of the correlative coefficient masks, correlation between the first data group and the first correlative coefficient mask to output a first judging value;

a second correlation judging unit, coupled to the latch and the storage unit, for judging, according to a second correlative coefficient mask of the correlative coefficient masks, correlation between the first data group and the second correlative coefficient mask to output a second judging value; and a comparator, for comparing the first judging value and the second judging value to generate corresponding data as the demodulated signal.

4. The RFID system of claim 3, wherein the demodulator further comprises:

a data packer, for collecting a plurality of sets of the corresponding data to form a second data group with a predetermined size, the second data group to be used as the demodulated signal and provided to the processing unit.

5. The RFID system of claim 3, wherein the first data group further comprises an auxiliary judging region and a data region, the storage unit further stores a plurality of auxiliary judging masks, and the first correlation judging unit or the second correlation judging unit further judges, according to a predetermined auxiliary judging mask of the auxiliary judging masks, correlation between the auxiliary judging region and the predetermined auxiliary judging mask to determine a position of the data region.

6. The RFID system of claim 3, wherein the first correlation judging unit and the second correlation judging unit are implemented by an adder or a multiplexer.

7. A demodulating module, comprising:

a processing unit, for generating a control signal; and a demodulator, coupled to the processing unit and stored with a plurality of correlative coefficient masks, for receiving a data signal, selecting one of the correlative coefficient masks according to the control signal, generating a demodulated signal according to the data signal and the selected correlative coefficient mask, and transmitting the demodulated signal to the processing unit.

8. The demodulating module of claim 7, being used for an RFID system.

9. The demodulating module of claim 7, wherein the correlative coefficient masks correspond to different communication protocols.

10. The demodulating module of claim 7, wherein the demodulator comprises:

a storage unit, coupled to the processing unit, for storing the correlative coefficient masks;

a latch, for latching a part of the data signal to form a first data group;

a first correlation judging unit, coupled to the latch and the storage unit, for judging, according to a first correlative coefficient mask of the correlative coefficient masks, correlation between the first data group and the first correlative coefficient mask to output a first judging value;

a second correlation judging unit, coupled to the latch and the storage unit, for judging, according to a second correlative coefficient mask in the correlative coefficient masks, correlation between the first data group and the second correlative coefficient mask to output a second judging value; and a comparator, for comparing the first judging value and the second judging value to generate corresponding data as the demodulated signal.

11. The demodulating module of claim 10, wherein the demodulator further comprises:

a data packer, for collecting a plurality of sets of the corresponding data to form a second data group with a predetermined size, the second data group to be used as the demodulated signal and provided to the processing unit.

12. The demodulating module of claim 10, wherein the first data group further comprises an auxiliary judging region and a data region, the storage unit further stores a plurality of auxiliary judging masks, and the first correlation judging unit or the second correlation judging unit further judges, according to a predetermined auxiliary judging mask of the auxiliary judging masks, correlation between the auxiliary judging region and the predetermined auxiliary judging mask to determine a position of the data region.

13. The demodulating module of claim 10, wherein the first correlation judging unit and the second correlation judging unit are implemented by an adder or a multiplexer.

14. A demodulating method, comprising steps of:
(a) providing a plurality of correlative coefficient masks;
(b) receiving a data signal;
(c) selecting one of the correlative coefficient masks; and
(d) generating a demodulated signal according to the data signal and the selected correlative coefficient mask.

15. The demodulating method of claim 14, being used for an RFID system.

16. The demodulating method of claim 14, wherein the correlative coefficient masks correspond to different communication protocols.

17. The demodulating method of claim 14, wherein the step (d) comprises steps of:
(d1) latching a part of the data signal to form a first data group;
(d2) judging, according to a first correlative coefficient mask of the correlative coefficient masks, correlation between the first data group and the first correlative coefficient mask to output a first judging value;
(d3) judging, according to a second correlative coefficient mask of the correlative coefficient masks, correlation between the first data group and the second correlative coefficient mask to output a second judging value; and
(d4) comparing the first judging value and the second judging value to generate corresponding data as the demodulated signal.

18. The demodulating method of claim 17, further comprising a step of:
collecting a plurality of sets of the corresponding data to form a second data group with a predetermined size, the second data group to be used as the demodulated signal.

19. The demodulating method of claim 17, wherein the first data group further comprises an auxiliary judging region and a data region, and the method further comprises steps of:
providing a plurality of auxiliary judging masks; and
judging, according to a predetermined auxiliary judging mask of the auxiliary judging masks, correlation between the auxiliary judging region and the predetermined auxiliary judging mask to determine a position of the data region.

20. The demodulating method of claim 17, wherein the step (d2) or (d3) utilizes an adder or a multiplier.

* * * * *